Feb. 26, 1952     J. G. LIVINGSTONE     2,587,344
NONDRIP POURING OUTLET
Filed Nov. 14, 1945     10 Sheets-Sheet 1
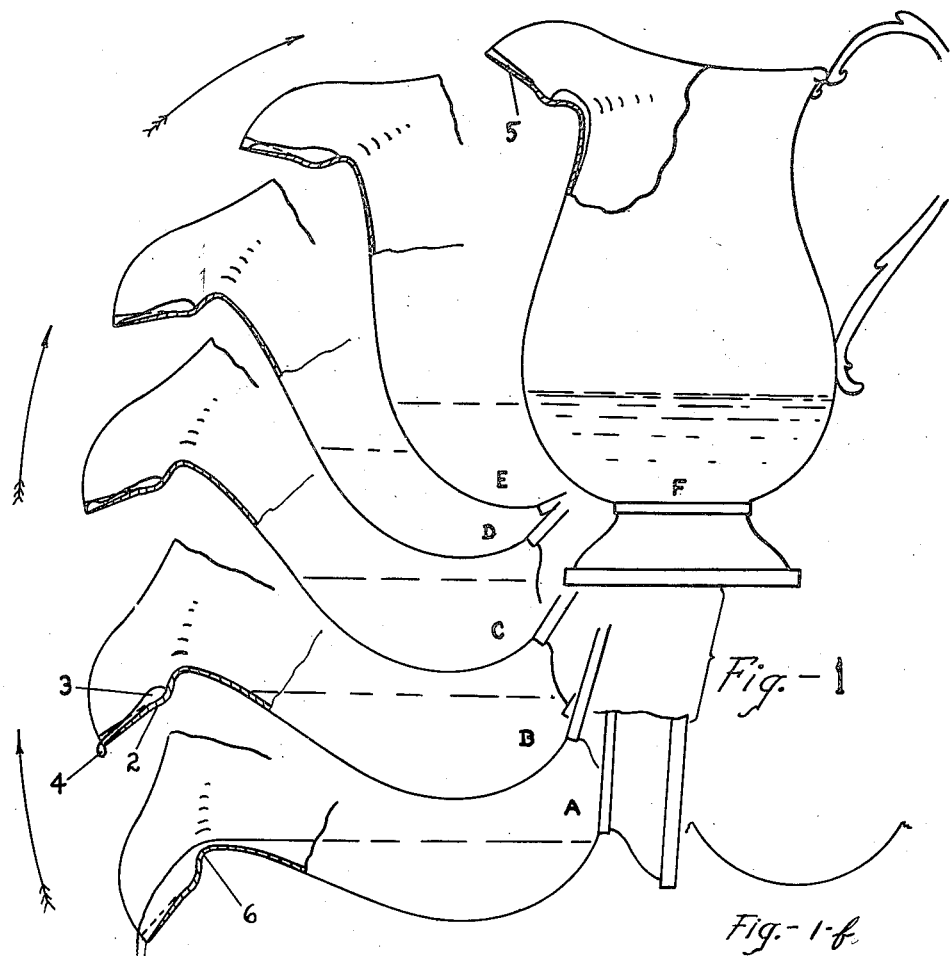
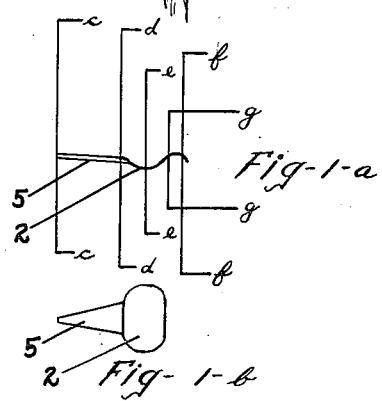
INVENTOR.
JAY G. LIVINGSTONE
BY
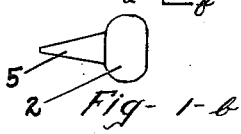

Feb. 26, 1952  J. G. LIVINGSTONE  2,587,344
NONDRIP POURING OUTLET
Filed Nov. 14, 1945  10 Sheets-Sheet 2

INVENTOR.
JAY G. LIVINGSTONE
BY

Feb. 26, 1952 J. G. LIVINGSTONE 2,587,344
NONDRIP POURING OUTLET
Filed Nov. 14, 1945 10 Sheets-Sheet 3

INVENTOR.
JAY G. LIVINGSTONE
BY Gordon C. Mack

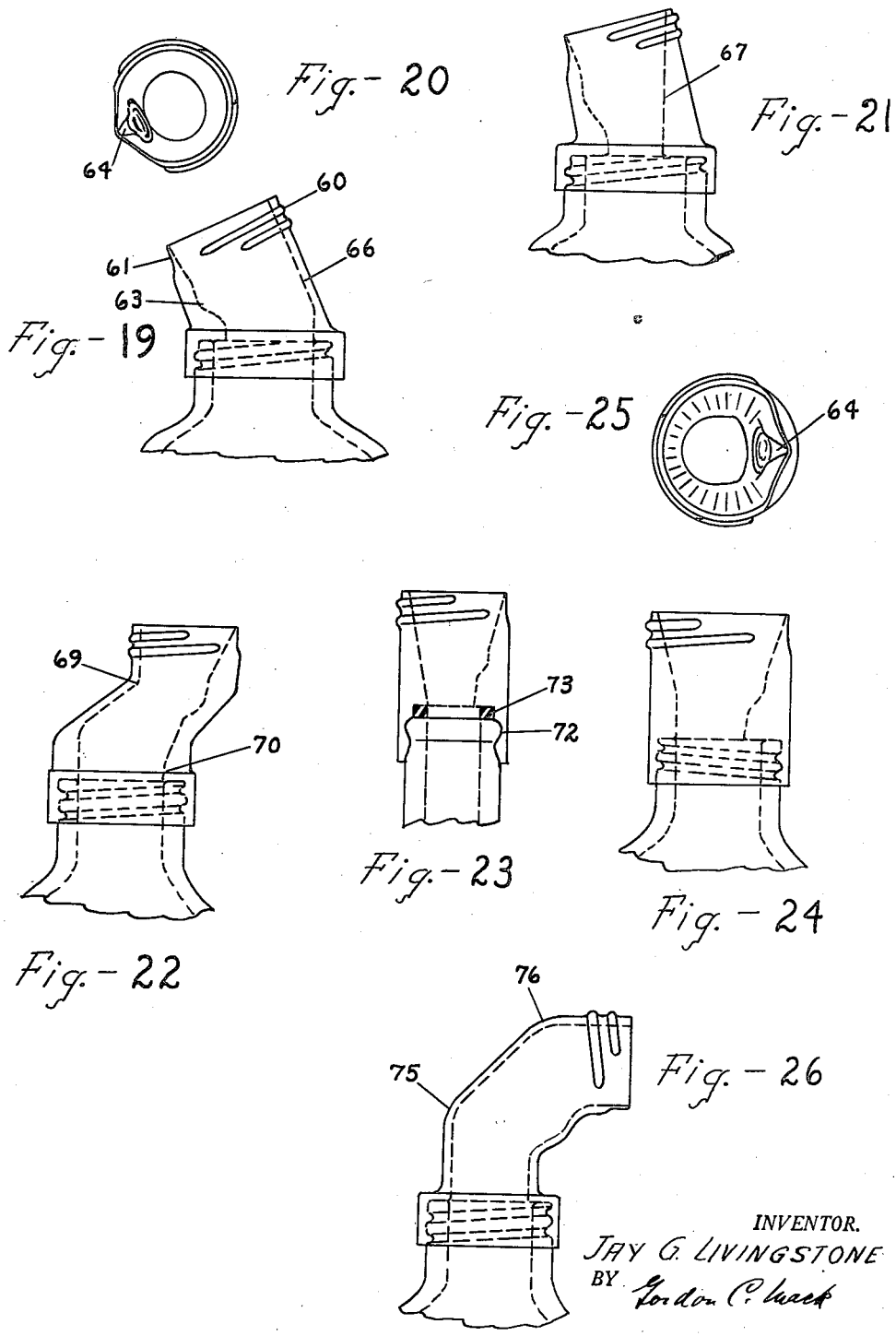

INVENTOR.
JAY G. LIVINGSTONE
BY Gordon C. Mack

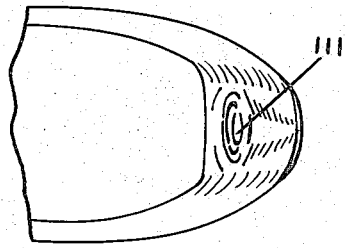
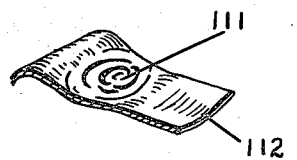
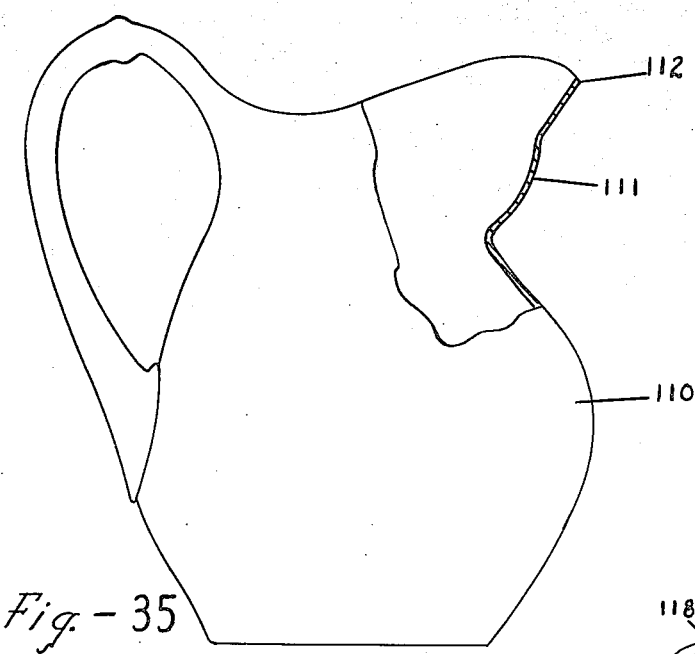
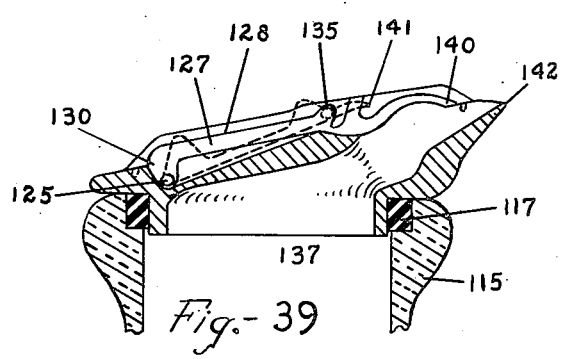
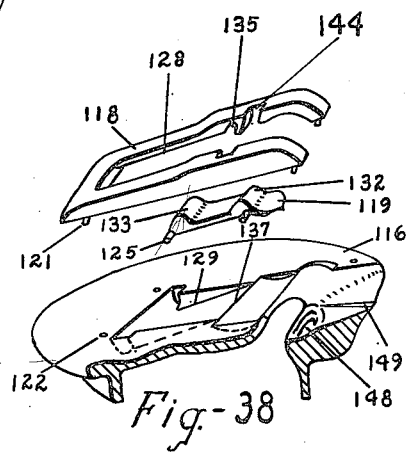

Feb. 26, 1952     J. G. LIVINGSTONE     2,587,344
NONDRIP POURING OUTLET
Filed Nov. 14, 1945     10 Sheets-Sheet 7
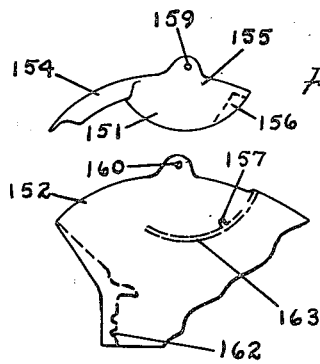
Fig.-41
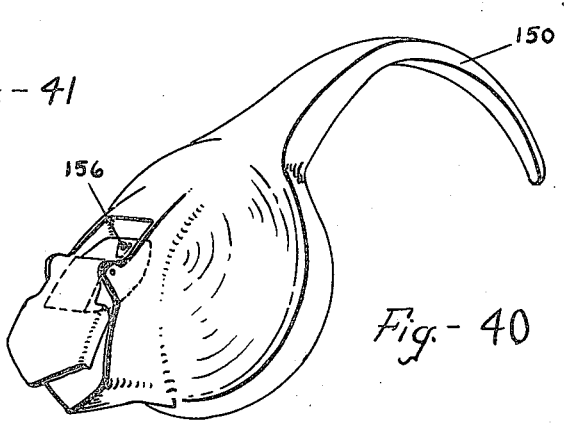
Fig.-40
Fig.-42
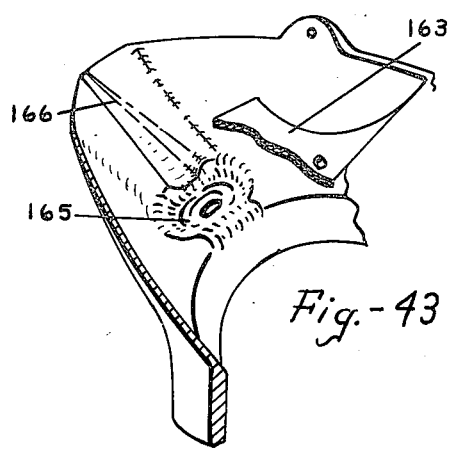
Fig.-43
Fig.-46
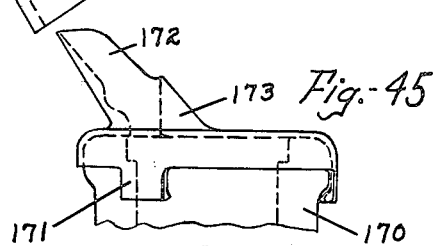
Fig.-45
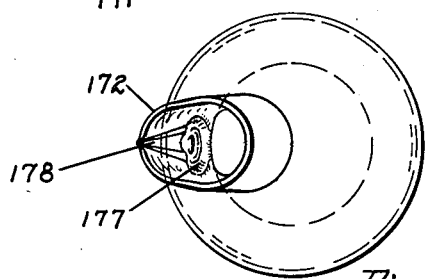
Fig. 44
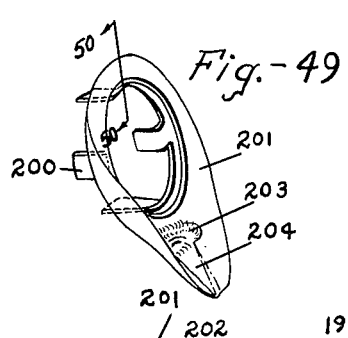
Fig.-49
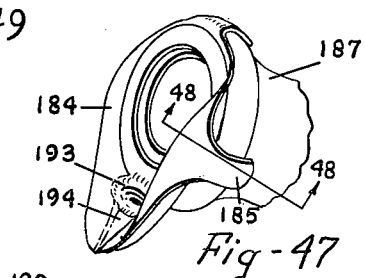
Fig.-47
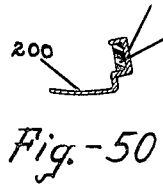
Fig.-50
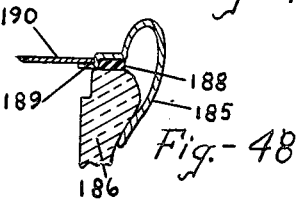
Fig.-48
INVENTOR.
JAY G. LIVINGSTONE
BY Gordon P. Mack

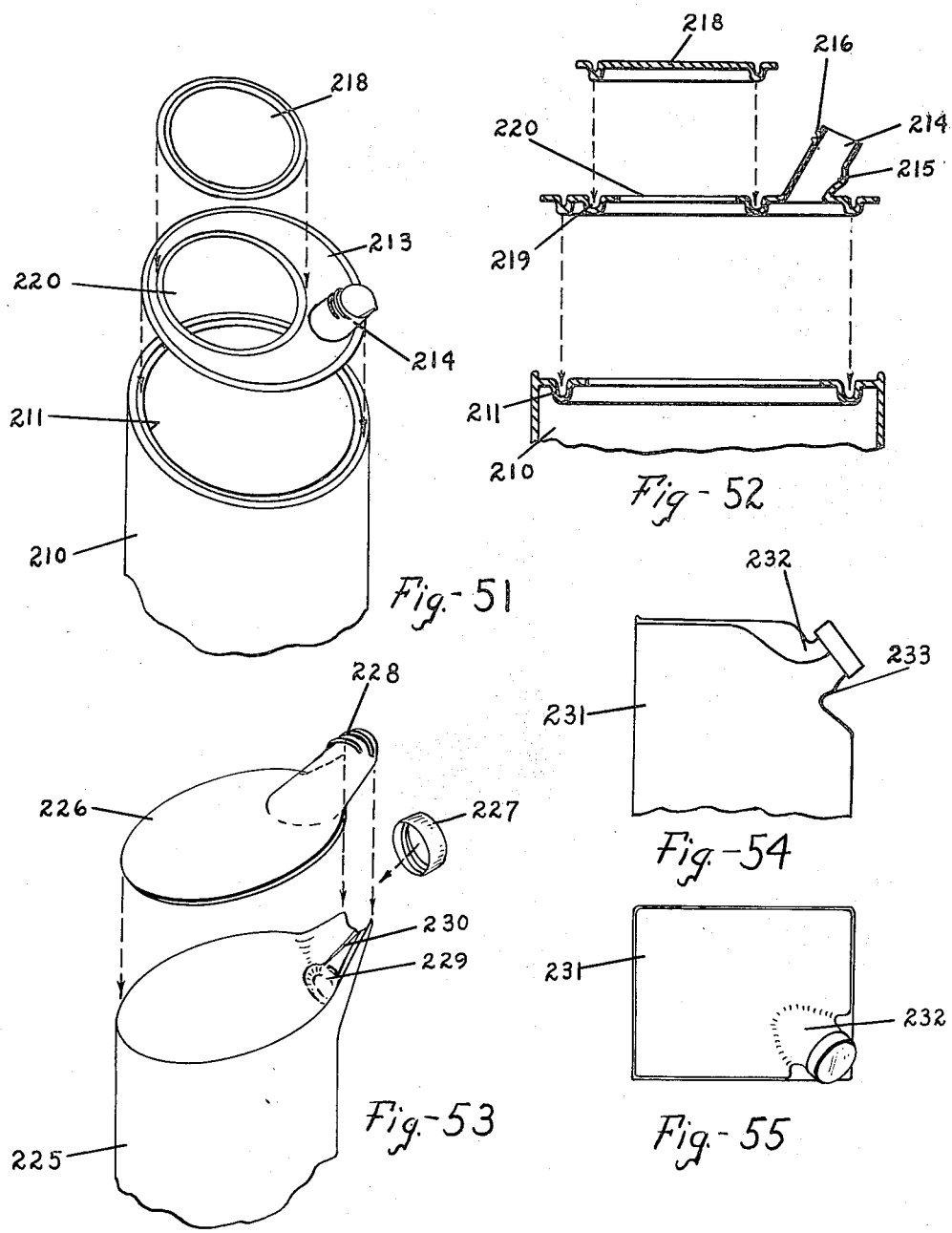

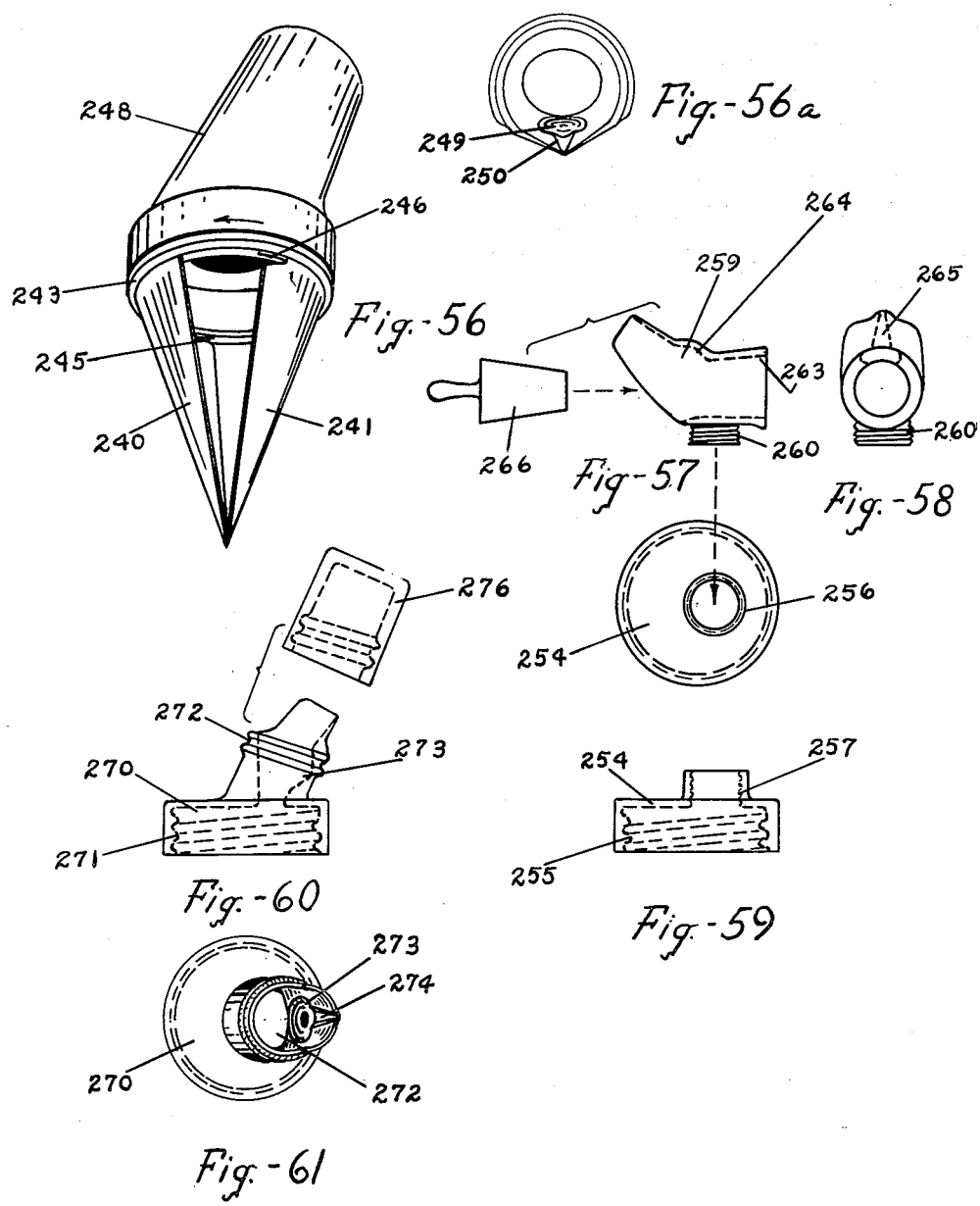

Feb. 26, 1952 J. G. LIVINGSTONE 2,587,344
NONDRIP POURING OUTLET
Filed Nov. 14, 1945 10 Sheets-Sheet 10
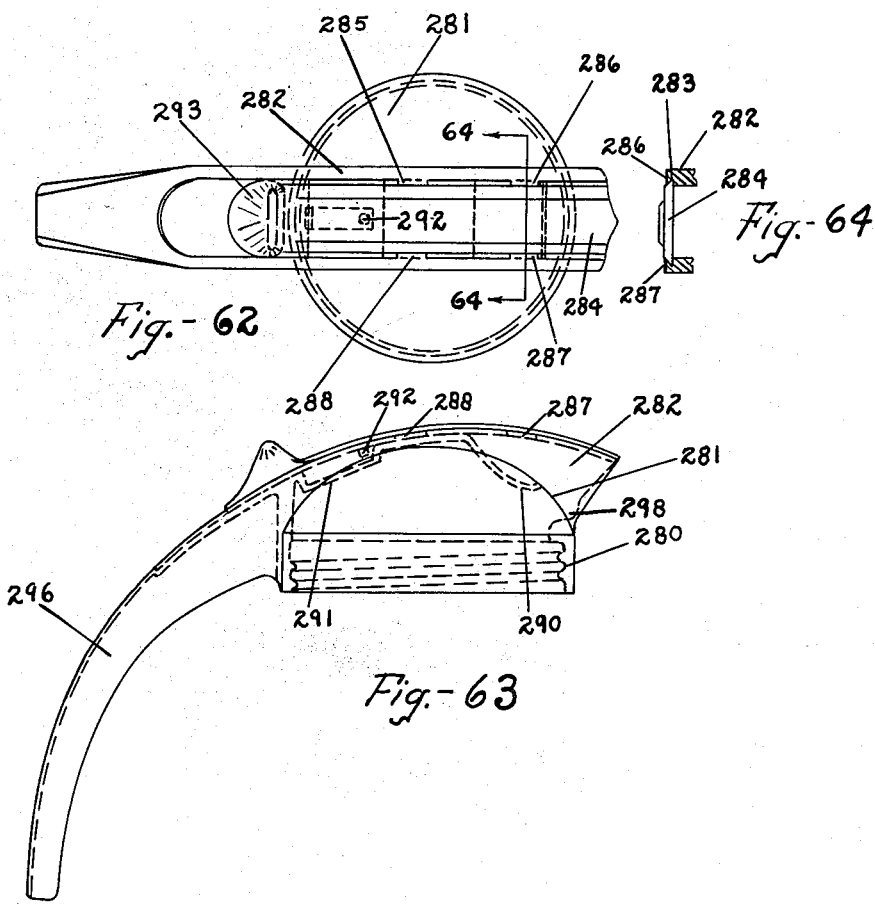
INVENTOR.
JAY G. LIVINGSTONE
BY Patented Feb. 26, 1952

2,587,344

UNITED STATES PATENT OFFICE 2,587,344

NONDRIP POURING OUTLET

Jay Gould Livingstone, Akron, Ohio

Application November 14, 1945, Serial No. 628,594

3 Claims. (Cl. 222—571)

This invention relates to improved pouring outlets for vessels, the outlets being designed to prevent liquid which is being poured from dripping from the lip of the outlet or from running down the outside of the outlet when the pouring is interrupted or the vessel is emptied. The pouring outlet of this invention may be merely a pouring lip, such as is customary on a cream pitcher or syrup jug or container of this type, or it may be a spout on a teapot or coffeepot, or it may be an auxiliary pouring outlet affixed to a vessel, such as a milk bottle or the like, or it may be any other type of pouring outlet. The vessel may be constructed of pottery, glass, plastic, metal, a composition material, such as pressed fiber, etc., or any suitable material. The application is continuation-in-part of my application Serial No. 538,123, filed May 31, 1944, and later abandoned.

It has been widely recognized that when one interrupts the stream of liquid being poured from a vessel or when the vessel is emptied, the last drop or the last several drops will drip from the lip of the outlet or run down its outside unless they are wiped away. The drop or drops which drip from the pouring outlet or run down the underside of the outlet when the pouring is interrupted or the container is emptied are herein called the "afterdrop." This afterdrop not only results in loss of the liquid and soiling of the outside of the vessel, but it, likewise, soils or damages the table or table spread or the like on which the vessel may be placed. Such soiling of the table or table spread is an annoyance in a dining room or a kitchen; and in a chemical laboratory, for example, serious damage may result. Although attempts have been made to design an outlet which prevents formation of the afterdrop, no satisfactory solution to the problem was found prior to my invention.

According to this invention a small recess (sometimes hereinafter called an auxiliary volume recess) is provided in the pouring outlet in which liquid adhering to the surface of the outlet collects when the pouring is interrupted or the vessel is emptied and as the vessel is again being brought to the upright position. The liquid which thus collects in the recess draws other liquid to it, and this cohesion between the molecules of the liquid which draws the liquid from the walls of the outlet into the recess prevents the afterdrop. The cohesion between the molecules of the thin layer of liquid on the inner surface of the pouring outlet is not sufficient of itself to prevent the afterdrop, but by providing a recess in the inner surface of the outlet in which a few drops of the liquid collect, a body of the liquid is formed which has sufficient cohesion with the liquid on the surrounding surface to draw this liquid to it and prevent the afterdrop.

In the preferred form of the invention there are one or more grooves leading from the recess toward the lip of the outlet located parallel to the flow of the liquid. Alternatively, there may be one or more grooves leading from the recess away from the lip of the outlet, or there may be such a groove or grooves in addition to the groove or grooves leading toward the lip of the outlet where desired. Such grooves will ordinarily be rounded in cross section and blend into the recess to avoid sharp angles which have a tendency to break the film of liquid.

In a pitcher or similar vessel there is a high point over which the liquid must flow in passing from the body of the vessel to the lip of the outlet. In such vessels the recess of this invention is ordinarily located between such high point and the lip of the vessel. The recess may be located quite close to the lip but is preferably spaced some little distance back. In a preferred form of the invention the recess is located about one-half or three-quarters of an inch from the lip of the outlet, and there is a single groove leading from the recess which narrows down toward the outlet. The groove may be V-shaped or rectangular or rounded in cross section. It serves to collect the liquid from the lip of the outlet and from the walls near the lip and connect this deposit of liquid with the liquid in the recess, and this collected liquid coheres with the thin layer of liquid on the surface of the outlet and draws it toward the recess and thus prevents the afterdrop.

When the pouring of a liquid from a vessel provided with an auxiliary volume recess as here contemplated is interrupted, the stream of liquid is usually severed into two parts with a positive and complete backflow of the part of the stream left on the outlet so that no afterdrop occurs. This will be further explained in what follows. Likewise, no afterdrop occurs when a vessel with such an outlet is completely emptied because the liquid which would form the afterdrop will cohere to the liquid in the auxiliary volume recess, as the vessel is brought to the upright position, and with the film of liquid on the surface of the outlet will be drawn into the recess, preventing the formation of any afterdrop.

The cohesion of different liquids vary; even cohesion of the same liquid at freezing and at boiling differs. The adhesion between different liquids and materials of which a vessel may be constructed also varies. The nature of the surface of the vessel also affects the cohesion; i. e., whether it is pitted, whether it is covered with grease, etc. The nature and location of a recess which are best adapted to prevent afterdrop with a certain liquid in a vessel of one composition may not be best adapted for preventing afterdrop with a different liquid or a different vessel. For example, the design best adapted to prevent the afterdrop of coffee cream from a silver vessel may not be best adapted to prevent afterdrop of heavy corn syrup from a glass vessel or alcohol from a porcelain vessel. The drawings are, therefore, in some instances merely suggestive of what might be used. On the other hand, Fig. 1 is a careful duplication in size, etc., of a silver cream pitcher which very effectively prevents afterdrop of coffee cream. It has also been used without afterdrop on syrups, meat sauces, vinegar, flavoring extract, etc. It illustrates the mechanism of preventing afterdrop as the pitcher is returned to the upright position after being partially emptied. This Fig. 1 is an elevation, partly in section;

Fig. 1a shows the outline of the recess and groove along the center line of the spout;

Fig. 1b is a plan view showing the outline of the groove and recess;

Figure 2:
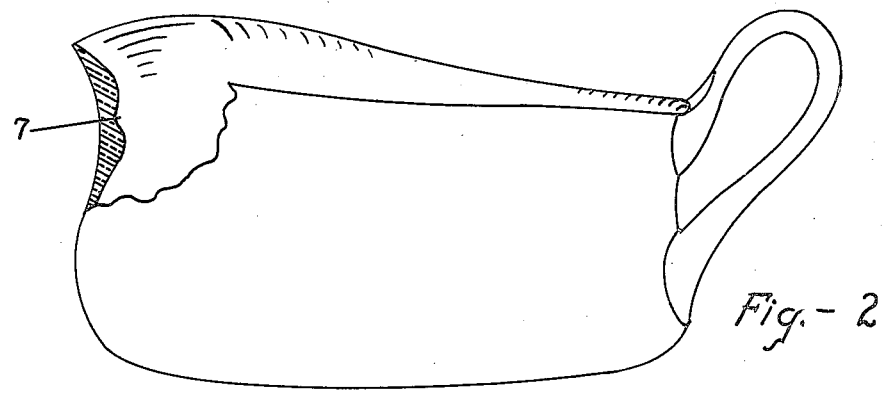
Figure 3:
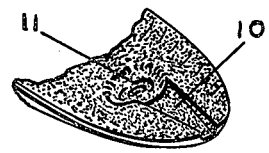
Figure 4:
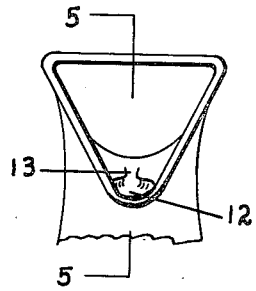
Figure 8:
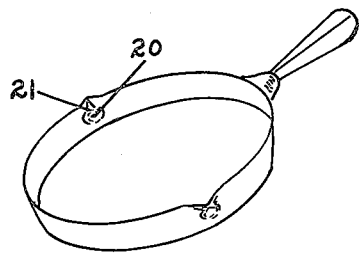
Figure 5:
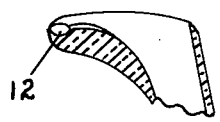
Figure 6:
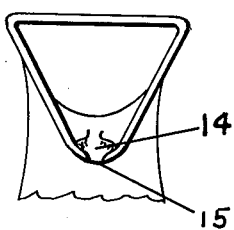
Figure 9:
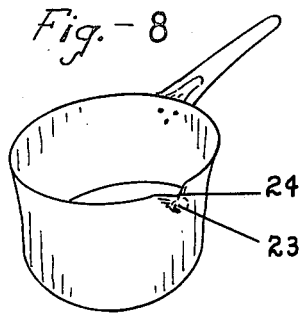
Figure 7:
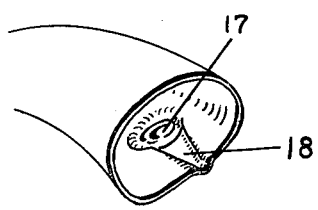
Figure 10:
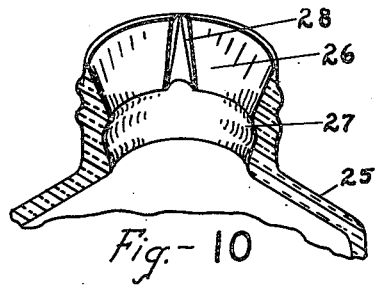
Figure 11:
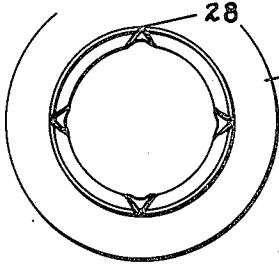
Figure 12:
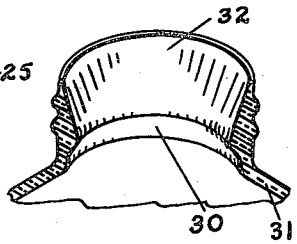
Figure 13:
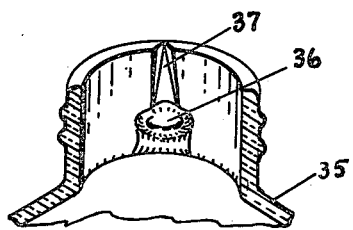
Figure 14:
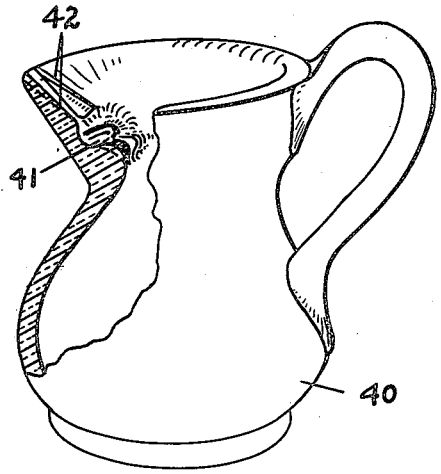
Figure 15:
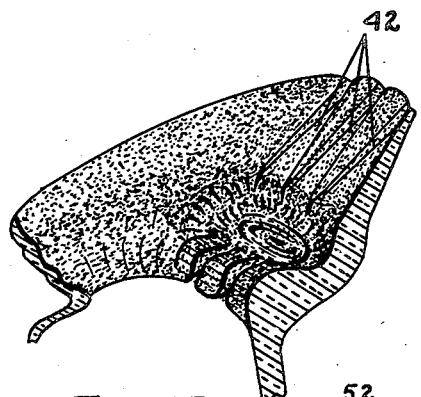
Figures 16, 17, 18:
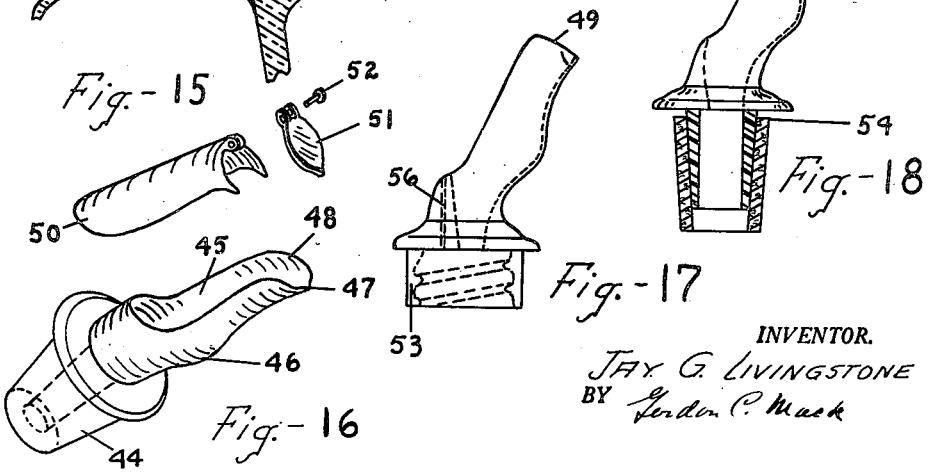
Figure 28:
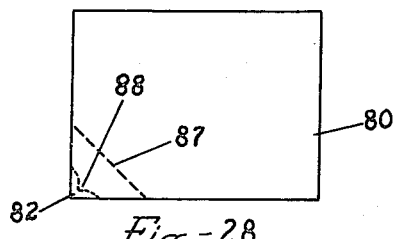
Figure 27:
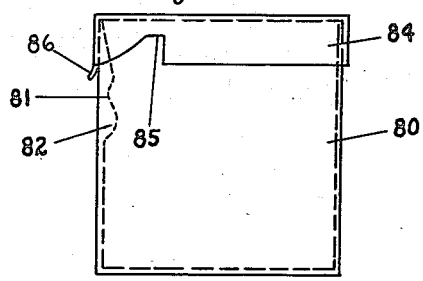
Figure 30:
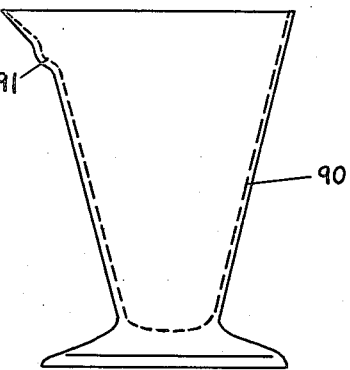
Figure 29:
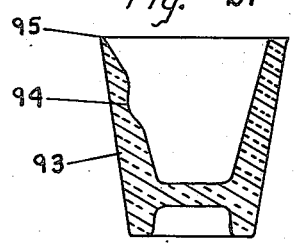
Figure 31:
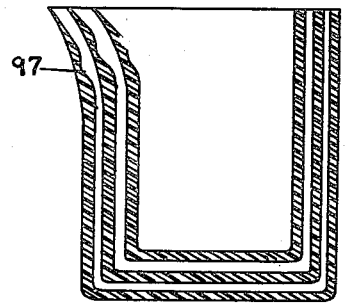
Figure 34:
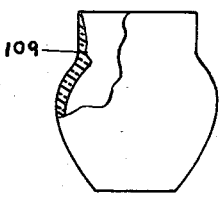
Figure 32:
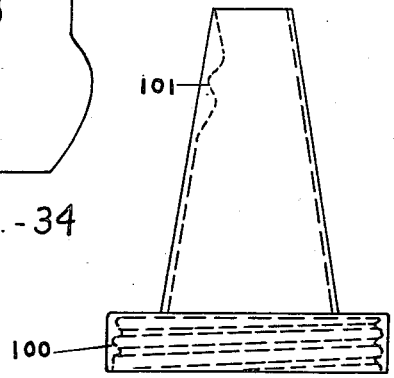
Figure 33:
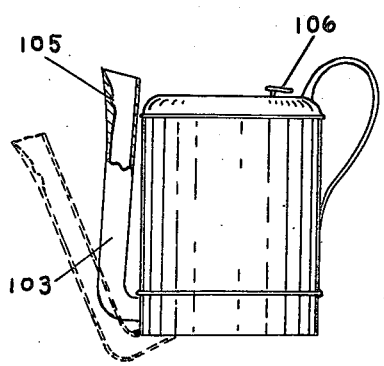

Figs. 1c, 1d, 1e, 1f, and 1g are sections on the lines c—c, d—d, e—e, f—f, and g—g, respectively, of Fig. 1a;

Fig. 2 is a side view of a gravy boat or the like, partly broken away at the spout;

Fig. 3 illustrates in perspective a knurled metal spout;

Fig. 4 is a view into the top of the spout of a teapot or the like;

Fig. 5 is a section on the line 5—5 of Fig. 4;

Fig. 6 is a view into the top of another spout;

Fig. 7 is a perspective view into the open end of another type of spout;

Fig. 8 shows in perspective a frying pan;

Fig. 9 is a view in perspective of a sauce pan;

Fig. 10 is a view in section of the top of a bottle;

Fig. 11 is a plan view of the top of the bottle shown in Fig. 10;

Fig. 12 is a view in section of a different type of bottle top;

Fig. 13 is a view in section of still a different type of bottle top;

Fig. 14 is an elevation, partly in section, of a porcelain or earthenware pitcher;

Fig. 15 is a detail showing the spout of the pitcher of Fig. 14, but etched;

Figs. 16, 17, and 18 are side views of different types of auxiliary pouring outlets for whisky bottles and the like;

Fig. 19 is a side view of a different type of pouring-outlet adapter which may be used on a bottle of syrup, medicine, whisky, etc.;

Fig. 20 is a top view of the adapter shown in Fig. 19;

Figs. 21, 22, 23, and 24 are side views of different types of adapters;

Fig. 25 is a top view of the adapter shown in Fig. 24;

Fig. 26 is a side view of a different type of adapter;

Fig. 27 is a side view of a milk container formed of treated pasteboard or the like;

Fig. 28 is a top view of the container shown in Fig. 27;

Fig. 29 is a view in section of a jigger;

Fig. 30 is an elevation of a graduate;

Fig. 31 is a sectional view of a nest of beakers;

Fig. 32 is an adapter for an oil can;

Fig. 33 is an elevation, partly in section, of an oil can with a movable spout;

Fig. 34 is an elevation, partly in section, of a small syrup jug;

Fig. 35 is an elevation, partly in section, of a metal pitcher;

Fig. 36 is a top view of a spout of the pitcher shown in Fig. 35;

Fig. 37 is a detail showing the recess in the spout of the pitcher of Fig. 35;

Fig. 38 is an exploded view showing in perspective the three parts of an adapter for a milk bottle or the like;

Fig. 39 is a view partly in section of the adapter of Fig. 38 assembled for use;

Fig. 40 is a view in perspective of an adapter for the top of a screw-top container for syrup or the like;

Figs. 41 and 42 are details of the adapter shown in Fig. 40;

Fig. 43 is an inside view of the adapter of Fig. 40 with the top removed and parts broken away;

Fig. 44 is a plan view of an adapter for the top of a cream bottle or the like;

Fig. 45 is a side view of the adapter shown in Fig. 44;

Fig. 46 is a side view of the cover of the adapter shown in Fig. 45;

Fig. 47 is a view in perspective of a different adapter on the top of a milk bottle;

Fig. 48 is a detail in section on the line 48—48 of Fig. 47;

Fig. 49 is a view in perspective of another adapter for the top of a milk bottle;

Fig. 50 is a detail in section on the line 50—50 of Fig. 49;

Fig. 51 is a view in perspective of a paint can provided with a novel pouring spout with the parts of the can separated from one another;

Fig. 52 is a side view in section of the same can with the parts similarly separated;

Fig. 53 is a side view in perspective of a tin can provided with a pouring spout with the parts separated;

Fig. 54 is a side view of a square tin can provided with a spout;

Fig. 55 is a top view of the can shown in Fig. 54;

Fig. 56 is a view in perspective of a can opener with a pouring spout;

Fig. 56a is a plan view of the interior of the spout of the can opener of Fig. 56;

Fig. 57 is an exploded view of the top of an ink bottle with the pouring attachment shown in elevation and a stopper for the same;

Fig. 58 is a top view of the pouring attachment of Fig. 57;

Fig. 59 is a side view of the ink-bottle top shown in Fig. 57;

Fig. 60 is an exploded view of a different design of ink-bottle top;

Fig. 61 is a top view of the ink-bottle top shown in Fig. 60;

Fig. 62 is a plan view of an attachment for a jug of syrup or the like;

Fig. 63 is an elevation of the same; and

Fig. 64 is a section on the line 64—64 of Fig. 62.

The pitcher 1 of Fig. 1 is a silver cream pitcher of the exact size illustrated. The various positions of the pitcher are indicated by the letters A, B, C, D, E, and F. In position A the pitcher is in a horizontal position, and cream is being poured from it. As the pitcher is turned upright, the stream of cream is broken. Except for the auxiliary volume recess 2 located in the spout of the pitcher, there would be an afterdrop. However, as the stream of cream is broken, the recess holds some of the cream, and the several drops 3 which are collected in the recess and in the groove connecting the recess and the lip draw the liquid on the surface of the outlet toward the recess and even draw back the portion 4 of the liquid which extends beyond the lip and would form the afterdrop if it were not for the cohesion between this body of liquid 4 and the body 3 which collects in the auxiliary volume recess. The groove 5 is best shown in position F. It will be noted that when the pitcher is brought to position C, the liquid 4 is drawn back over the lip of the outlet, and in the succeeding positions up to position E the liquid is collecting in the recess, and in the position F it drains down the inside wall of the pitcher. Thus, the cohesion of the liquid in the recess for the liquid on the wall of the pouring outlet and even for the portion 4 which extends beyond the lip causes this liquid to be drawn into the recess 2, and thus afterdrop is prevented.

The recess 2 and groove 5 blend smoothly into the adjoining surfaces. There are no sharp edges which tend to break the film of liquid which covers them. Fig. 1a shows the contour of the recess 2 along its center line and the depth of the groove 5. Fig. 1b shows the outline of the upper edge of the groove and recess. The groove is narrow at the lip (Fig. 1c) and widens (Fig. 1d) as it reaches the recess. The contour across the width of the recess is shown in Fig. 1e. This recess is just forward of the high point at the neck of the pitcher. The pitcher is wide at the neck as shown in the sections 1f and 1g.

A silver pitcher with an outlet designed as shown in Fig. 1 has been used for pouring a wide variety of liquids without any afterdrop. For example, it has been used satisfactorily on easy-flowing liquids, such as water and whiskies, and has also been used satisfactorily on heavy viscous syrups, etc. However, the improved pouring spout of this invention is not limited to the exact dimensions shown in Fig. 1. For instance, in designing a vessel for dispensing heavy syrups, and particularly a vessel with a narrow pouring outlet which restricts the area of liquid which may be held in the outlet, such as an outlet of the general design shown in Fig. 24, the recess may advantageously be somewhat larger than that shown in Fig. 1, and the groove connecting it with the pouring lip may be somewhat longer. This accelerates the drawing back of the heavy syrup into the recess and speeds up the cutting off of the stream of liquid without afterdrop. An adapter of this general type, with a restricted pouring outlet, designed for light, easy-flowing liquids, such as whiskies, etc., may have a shallower recess; and as shown in Fig. 19, the groove may be shorter.

Some vessels, such as a water glass, have a perfectly straight wall between the bottom and the pouring lip. Others, such as a cream pitcher, provide a high point, such as the curve 6 at the throat of the pitcher 1. In such vessels the recess of this invention is ordinarily located between the high point and the lip of the pouring spout.

The succeeding figures of the drawings illustrate the application of the principle to various types of vessels. For example, in Fig. 2 the porcelain gravy boat has an auxiliary volume recess 7 which collects several drops of the liquid being poured from the boat, and the cohesion of these drops for the film on the surface of the outlet prevents the formation of the afterdrop.

Fig. 3 shows the metal pouring outlet of a gravy boat or the like. There is a groove 10 extending from the auxiliary volume recess 11 to the very lip of the outlet. The surface of the spout has been slightly knurled to increase the adhesion between the liquid and the metal and thus aid in preventing afterdrop.

It must be realized that the conditions producing afterdrop may be aggravated, as by jerking the vessel to the upright position. The recess prevents afterdrop under conditions where it might otherwise occur. The location of the recess may vary. Figs. 4 and 5 show it located adjacent the lip of the spout of a teapot or the like. Without the recess 12 there is no tendency for the liquid to hold together and collect in a central place when the pouring is interrupted. The recess holds a small body of the liquid right at the lip of the spout, and this body of liquid draws other liquid to it so that when the pouring is interrupted, there is no shattering of the stream with separated droplets on the inner surface of the spout, some of which may go toward the lip and be carried over the outside of the lip and down the outer surface of the spout; but when the pouring stream is interrupted, the liquid in the spout and particularly that at the lip is held together as a body; and when the container is brought to the upright position as shown in Figs. 4 and 5, most of the liquid will drain back from the spout although a drop will ordinarily remain in the recess 12. The groove 13 insures severance of the stream of liquid into two distinct parts when the pouring is interrupted.

Fig. 6 shows a similar recess and groove 14, but the lip, instead of being of uniform height as in Figs. 4 and 5, has an opening 15 in it. The action of the spout and recess is the same as that above described, it being understood that the opening 15 is not so low as to permit the draining of liquid from the recess 14 through the opening and down the outer wall. The opening is ordinarily no wider than to accommodate a drop of water.

In the spout of Fig. 7 the recess 17 is set back somewhat from the lip and is connected with the lip by the groove 18 which is wider at the recess and narrows down toward the lip.

In the frying pan of Fig. 8 there is a recess 20 at each pouring lip, and a groove 21 extends from the recess to the lip.

In the sauce pan of Fig. 9 there is, likewise, a recess 23 which is connected with the lip by the groove 24.

There are different ways of embodying the invention in a bottle. Figs. 10 and 11 show the bottle 25 with the neck 26. The auxiliary volume recess 27 extends around the inside of the neck on all sides of the bottle. There are four grooves 28 leading from this recess to the lip of the bottle. Fig. 12 shows a similar construction with the auxiliary volume recess 30 extending clear around the inside of the neck of the bottle 31, but there are no grooves in the neck 32. As liquid is poured from the bottle, that which collects in the recess 27 (Fig. 10) or 30 (Fig. 12) coheres to other liquid on the wall of the inner surface of the neck of the bottle; and as the pouring ceases, this cohesion draws the liquid into the recess and prevents the afterdrop. If applied to a milk bottle, a ledge for the cap of the milk bottle will be provided just below the recess.

Fig. 13 illustrates how a bottle 35 may be provided in the neck with one or more individual recesses 36 with a groove 37 leading from each recess to the lip of the bottle.

Fig. 14 shows a porcelain or pottery pitcher 40 with an auxiliary volume recess 41 in the spout and a plurality of grooves 42 leading from the recess to the lip of the pitcher. Fig. 15 shows three such grooves 42 and shows the inner surface of the spout etched to provide for better adhesion between the liquid and this surface. Such better adhesion aids in preventing afterdrop.

There are on the market various types of adapters for liquor bottles and the like. None of them prevents the afterdrop. The liquor runs down the underside of the lip, and this becomes sticky. Sometimes the afterdrop runs down the side of the bottle and messes up the counter or table on which it is placed. This invention includes adapters which eliminates the afterdrop. Various types of such adapters for liquor bottles are shown in the drawings.

Fig. 16 shows an adapter formed from cellulose acetate or the like. The lower portion 44 fits tightly inside of the neck of the liquor bottle. The spout 45, which is made of cellulose acetate, includes the recess 46 and the groove, the end of which is indicated at 47. The draw of the liquor in the recess on the thin coating of liquor on the walls of the adapter is improved if the sides of the spout are not cut away as shown at 48 in Fig. 16 but rise more perpendicularly as indicated at 49 in Figs. 17 and 18. The adapter of Fig. 16 is, therefore, preferably composed of several parts including the cover portion 50 and the lid 51 which swivels on the pin 52. The edges of the cover 50 and the body portion of the adapter 45 are softened by treating with acetone, and the two parts are then pressed together to become permanently bonded. The adapter of this design—whether formed of plastic or of silver, aluminum, etc.—works very efficiently to prevent afterdrop.

The adapters of Figs. 17 and 18 with spouts molded from cellulose acetate are similar to one another except that the base 53 of the adapter shown in Fig. 17 is threaded internally to screw onto the top of a bottle, and the base 54 of the adapter shown in Fig. 18 fits down inside a cork for insertion in a bottle. The adapter shown in Fig. 17 is provided with an air vent 56. A similiar air vent is advantageously provided in the adapter of Fig. 18 and other adapters in which the liquor flows through a narrow opening.

Various modifications of a different type of adapter for a liquor, medicine or syrup bottle or the like are shown in Figs. 19-26. All of these adapters are threaded externally (as at 60 in Fig. 19) to receive a cap. It will be noted that the threads do not extend entirely around the adapters, and there is no thread at the lip of any of the adapters to interfere with the prevention of afterdrop. Each of these adapters is undercut at the lip as indicated at 61 in Fig. 19. This aids in preventing afterdrop. Each of the adapters is provided with a recess 63 and a groove leading from the recess to the lip of the spout as indicated at 64 in Figs. 20 and 25.

The adapter of Fig. 19 is made of metal, plastic or the like. The adapter of Fig. 21 is designed to be made of plastic. The external shape of each is substantially the same although, as shown, the adapter of Fig. 21 is at a little smaller angle to the vertical than the adapter shown in Fig. 19. The chief difference between the two adapters of Figs. 19 and 21 is that the back inner wall 66 of the adapter of Fig. 19 is at an angle, whereas the back inner wall 67 of the other adapter is vertical. The adapter shown in Fig. 21 is, therefore, easily molded because the core which molds the pouring outlet of Fig. 21 moves perpendicularly in and out of the plastic being molded, and the threaded underportion of the adapter is molded in the usual way by a collapsible threaded mold.

Fig. 22 shows a different shaped adapter, likewise made of plastic. In molding, the upper mold moves vertically, and the lower portion of the mold, likewise, moves vertically; and the two meet along the plane which joins the points 69 and 70.

Fig. 23 shows another type of adapter which is molded of plastic, the bottom portion of which is springy so that it clips around the neck 72 of a bottle. Leakage is prevented by the gasket 73.

The adapter of Fig. 24 is made of plastic. It differs from the design of Fig. 21 in having the top and bottom edge parallel. This facilitates packing.

The adapter of Fig. 26 is made of metal. Originally, it is made with the walls vertical, and after fashioning, it is bent at 75 and 76 in a usual tube-bending device. The recess and groove which prevent afterdrop and the threads can be formed hydraulically or by the use of rubber under pressure in a mold in a manner similar to that now used for forming designs on various stampings. This may be done before or after bending.

The use of a recess to prevent afterdrop is not limited to spouts of the type previously discussed. Figs. 27 and 28 illustrate two views of a small square treated carton or box 80 for milk. The recess 81 is formed in flexible plastic 82. It may be formed into an inner lining of treated paper and sealed into position, or it may be formed into the body of the container. The cover 84 is weakened on two sides near one corner by cutting away portions of the sides at 85, and this corner is provided with the opening lip 86. The lid is fastened onto the body of the box by paraffin or the like so that there is no danger of its slipping off unintentionally. When the package is to be opened, the opening lip 86 is lifted, and the corner of the lid folds back along the line 87, the ends of which are above the cut-out portions 85. The recess 81 acts in the same manner as previously described, collecting several drops of the milk when the pouring ceases, and these through cohesion draw the liquid from the walls of the outlet so that there is no afterdrop. The groove 88 connects the recess 81 with the corner of the package.

Fig. 30 illustrates a graduate 90, such as is used in chemical laboratories and the like. The recess 91 in the pouring spout, preferably in combination with a groove leading to the lip of the graduate, as previously described, prevents afterdrop which in the handling of acids and other dangerous chemicals is very advantageous.

Fig. 29 is a cross section of an ordinary glass jigger 93 for whisky and the like. It is provided with a recess 94 in a spout which leads to the thin lip 95. A groove (not shown) connects the recess with the pouring lip. These prevent afterdrop.

Fig. 31 shows a nest of measuring cups or the like which may, for example, be made of synthetic resin. They may be graduated if desired. The pouring spouts are each provided with a recess 97 and groove (not shown) which prevent afterdrop.

Fig. 32 is the removable pouring spout customarily used on jars of lubricating oil in transferring the lubricating oil to an automobile. It is generally made of metal and is provided with threads 100 to screw onto the oil jar. The recess 101 in the lip in combination with a groove (not shown) which leads to the lip prevents afterdrop.

Fig. 33 illustrates the usual type of oil can with an adjustable spout 103 used for transferring oil to an automobile or the like. The pouring spout is provided with an auxiliary volume recess 105 and groove (not shown) which prevent the afterdrop. The flow of liquid is controlled by a valve operated in the usual manner by the handle 106.

Fig. 34 illustrates an individual syrup jug made of glass or the like. The recess 109 and groove (not shown) which leads from the recess to the pouring lip prevents afterdrop which in the case of syrup is particularly advantageous because due to the sticky nature of the syrup the afterdrop—whether a drip or liquid running down the side of the syrup jug—is particularly disagreeable.

Figs. 35, 36, and 37 are views of a metal pitcher 110 provided with a recess 111 a short distance back from the lip 112 of the pouring outlet. An aluminum pitcher of this size with spout as shown had no afterdrop when used for pouring milk, water, tea, coffee, syrup, etc. It is to be noted that there is no particular groove between the recess and the lip of the pouring outlet. The outlet is flat except for a very slight curvature illustrated in Fig. 37. The liquid which collects in the recess coheres with the liquid on the surface of the pouring outlet and draws the liquid into the recess, thus preventing afterdrop.

Figs. 38 and 39 illustrate an improved form of closure for a milk bottle 115. The closure is formed of three parts; namely, the base portion 116 which makes a tight fit with the interior of the milk bottle with the aid of the gasket 117, the top portion 118, and the slide or middle portion 119. The top portion is provided with pegs 121 which fit into holes 122 in the base portion. There are four dogs 125 on the two sides of the slide portion, and these fit into the tracks 127 formed between the lower edge 128 of the upper portion 118 and the upper surface 129 of the lower portion 116. As best shown in Fig. 39, the back portion of the track is recessed at 130 to prevent the slide 119 from shifting forward when the assembly is tilted forward for pouring milk or other liquid from the bottle. The forward and backward humps 132 and 133 on the sliding lid make it possible by gentle pressure of the thumb to push the slide forward or backward. The forward dogs 125 fit in the bulge 135 of the track when the slide is in the open position with the rear dogs 125 lowered in the rear portion 130 of the track. To move the slide forward, slight pressure of the thumb on the hump 132 presses the forward dogs 125 down out of the bulge 135, and this same pressure causes the slide to tilt on the ridge 137, raising the rear dogs 125 out of the sunken portion of the track so that the slide is then easily moved forward. When pushed to the front portion 140 of the track, the forward lip 141 of the slide fits over the pouring lip 142 of the attachment and makes a tight seal. The widened openings 144 on each side of the upper piece 118 provide passage for the dogs 125 on insertion and removal of the slide. The recess 148 and groove 149 connecting it with the lip of the spout prevent afterdrop.

Another type of adapter designed particularly to be screwed onto a threaded jug of syrup is shown in Figs. 40–43. The handle portion 150 may be omitted. The adapter is made in two parts, 151 (Fig. 41) and 152 (Fig. 42). The adapter is advantageously molded of some light plastic material. The part 151 includes the cover portion 154 which closes over the pouring outlet when the syrup jug is erect. The rear portion of this part 155 is solid with a recess 156 on the underside, which recess receives the peg 157 of the lower portion 152. The part 151 swivels around a pin which fits through the openings 159 and 160. The rear portion 155 is heavier than the cover 154; so when the adapter is tilted forward for pouring as shown in Fig. 40, the lid portion 155 swings open until the pin 157 abuts against the rear of the recess 156 as shown in Fig. 40. Thus, the pin 157 limits the extent of the swing of the lid. The inner side of the bottom portion of the adapter is threaded at 162. The wall portion 163 narrows the throat of the pouring outlet and thus limits the size of the stream of syrup which can escape through this outlet and thereby prevents the syrup from contacting with the underside of the lid 154. As best shown in Fig. 43, the pouring outlet is provided with a recess 165 and a groove 166 which leads from the recess to the lip of the pouring outlet. These prevent afterdrop.

Figs. 44–46 show an adapter for a milk bottle 170. It is formed of a springy plastic, and the clips 171 hold it to the bottle. The base of the spout 172 is restricted by making the rear wall thick at 173. This controls the rate of flow of liquid. This design facilitates molding as it permits the part which molds the inner surface of the spout to be withdrawn vertically from the spout. The friction cap 175 fits over the spout. The inside of the cap may be molded to fit down tight over the spout 172 to prevent any liquid escaping from the spout when the cap is in place. Alternatively, the inside of the cap may be provided with a stopper which fits into and plugs the opening into the bottle at the base of the spout. The recess 177 and groove 178 prevent afterdrop.

Figs. 47 and 48 show a pouring lip 184 made of plastic, metal or the like which is provided with three prongs 185 which fit over the lip 186 of a milk bottle 187. The gasket 188 (which may be omitted if the adapter is made of plastic) makes a liquid-tight seal between the adapter and the lip of the milk bottle. The adapter is provided with a seat 189 for reception of a standard milk-bottle cap 190 so that after a part of the milk has been poured from the bottle, the cap may be put in place to protect the remainder of the milk in the bottle. The pouring lip is provided with a recess 193 and a groove 194 leading from the recess to the pouring lip.

Instead of having the prongs come from the outside edge of the adapter over the neck of the milk bottle, they may fit down inside the mouth of the milk bottle as the prongs 200 of the adapter 201 of Figs. 49 and 50. This adapter is, likewise, provided with a gasket 202. The recess 203 in the pouring outlet is connected with the lip by the groove 204.

Figs. 51 and 52 show an ordinary paint can 210 provided with an indentation 211 around the top opening for insertion of a friction top. Instead of an ordinary friction lid, this paint can is provided with a lid 213 which comprises a pouring spout 214. This spout includes a recess 215 and groove to prevent afterdrop. The spout is provided with partial threads 216 so that a cap may be screwed onto the spout when paint is not being poured from it. The lid 218 is a friction lid which fits into the groove 219. This can may be used as a storage can for replenishing a small paint supply from time to time, as required, and for this purpose the spout 214 will be used. If, on the other hand, the can is to be used as a receptacle for paint during the process of painting, the lid 218 will be removed, and the paint brush will be dipped in and out of the opening 220.

Fig. 53 shows an ordinary tin can 225, such as might be used for fruit juices and the like. A lid 226 will be soldered in place in any usual manner. The cap 227 may then be fitted on and screwed onto the threads 228. To prevent afterdrop, the spout is provided with a recess 229 and a groove 230 leading from the recess to the lip of the spout.

The square can 231 shown in Figs. 54 and 55 is provided with a spout 232 similarly formed in part from the body of the can and in part from the top of the can. The recess 233 and groove (not shown) prevent afterdrop.

Figs. 56 and 56a show an attachment to be forced into the top of a tin can of fruit juices or the like. It comprises the tapered blades 240 and 241. These are jabbed into the top of the tin can or the like, and the attachment is pushed down into the can until the rubber gasket 243 presses against the top of the can. The attachment is then turned in the direction of the arrow so that the notches 245 and 246 slip over the uncut edges which border the opening in the can. The spout 248 is provided on the inner surface near the lip with a recess 249 and groove 250 to prevent afterdrop. This attachment may be made of aluminum or other suitable material. The rubber gasket 243 provides a liquidtight seal with the top of the can. The outlet may be threaded and provided with a cap if desired.

Figs. 57–59 illustrate an ink-bottle top 254 threaded internally at 255, with a neck 256 threaded internally at 257. This top may be made of any suitable plastic or metal or the like. The pouring spout 259, which may also be of plastic or the like, has the cap or stopper 260 fastened to one side of it. This cap is threaded and when screwed into the neck of the ink bottle forms a liquidtight seal. The bottom of the pouring attachment is provided with a tapered opening 263 which fits down around the outside of the neck 256 when ink is to be poured from the bottle. If the two tapered parts are formed of cellulose acetate, they form a tight friction fit, and no leakage of ink occurs between them. The pouring outlet is formed with the recess 264 and groove 265 which prevent afterdrop. The stopper 266 is optional.

Another form of ink-bottle top is shown in Figs. 60 and 61. The top 270 is threaded internally at 271. Before screwing the top onto the bottle, the manufacturer will fasten a sheet of waxed paper or other membrane over the top of the bottle to prevent loss of ink until the ultimate consumer either punctures or removes this paper. Such a membrane also may be used advantageously on the bottle to which the top of Figs. 57–59 is to be applied. The top 270 is provided with the pouring spout 272 in which is the recess 273 and groove 274 which prevent afterdrop. The friction cap 276 is used to keep out dirt after the bottle has once been opened.

Figs. 62–64 show another type of adapter for a screwtop jar or the like. The threads 280 may be omitted, and the cover may then be suitably designed for fitting over or into any receptacle. The cover 281 is provided across the center with parallelly spaced upright portions 282 which are grooved at 283 to accommodate the slide 284. These grooves are covered at only the four places 285, 286, 287, 288 to hold the slide in place. The cover portion 281 extends across most of the area covered by the slide, and the portion 290 restricts the opening for the flow of liquid. The depression 291 in which the stop 292 moves limits the distance the cover may be moved. The knob 294 on the slide facilitates its operation. The handle 296 may be omitted. The recess 298 and groove (not shown), extending from the recess to the pouring lip, prevent afterdrop.

The pouring outlets illustrated are suggestive of the many applications of the invention. Adapters will be designed with regard for their appearance and adaptability when applied to the bottles, jugs, boxes, cans, etc., with which they are to be used. If built into a collapsible container, the recess may be formed of a rubber-like plastic so that it will not be damaged when the container is collapsed and will re-form itself when the container is erected. The adapter or vessel in which the recess is formed may be constructed of glass, metal, plastic, paper or paper-like sheets, composition materials, such as fiberboard and the like, etc. The invention is applicable to all kinds of pitchers, syrup dispensers, including individual syrup and cream servers, teapots, coffeepots, stew pans, sauce pans, skillets, kettles of all kinds, and other cooking utensils, bowls, various types of oil cans and dispensers except those through which the oil is forced through a slender narrowing opening, chemical containers, bottles, jugs, glasses, beakers, laboratory containers and vessels, paint containers, cans and other shipping containers, nozzles for gasoline hoses and the like, containers for lotions and liquid cosmetics, pharmaceuticals, etc. The list is merely suggestive of the comprehensive nature of the invention. Various modifications of the specific adaptations listed and described may be made within the scope of the invention.

In a preferred form of the invention shown in various of the illustrations, the pouring outlet includes, in addition to the auxiliary volume recess, a groove which is wide toward the recess and narrows down toward the lip. Such a groove is not essential but depending upon the shape of the pouring outlet will usually be found advantageous. A groove extending from the other side of the recess may be used, but such groove must not be designed to empty the recess before the liquid to be collected in the recess has had an opportunity of drawing in additional liquid which covers the surface of the pouring outlet and thus preventing afterdrop.

What I claim is:

1. An adapter for a bottle, comprising a base portion which includes a threaded skirt adapted to be screwed onto the bottle to form a liquid-tight connection with the bottle, a generally tubular body rising from the base, a portion of the upper edge of the tubular body having a relatively sharp edge to form a pouring lip for the adapter, the exterior surface of the body below the sharp pouring lip being undercut from the pouring lip in the normally upright position, on the interior surface of the tubular body below the pouring lip a recess adapted to hold no more than several drops of liquid, a groove in said interior surface extending from the pouring lip to the recess, and on the exterior surface of the body, toward the top thereof and away from said undercut portion, threads adapted to engage the threads of a closure cap to seal the closure cap against the upper edge of the body and the pouring lip.

2. An adapter for a vessel, comprising a base adapted to be fastened to the vessel to form a liquid-tight connection therewith, a generally tubular body rising from the base, a throat in the lower portion of the tubular body through which liquid from the vessel is adapted to flow when the liquid is poured from the vessel through the tubular body, a portion of the upper edge of the tubular body having a relatively sharp edge to form a pouring lip for the adapter, the interior surface of the tubular body below the pouring lip including a substantially vertical wall but being inclined away from the vertical sufficiently so that the pouring lip is offset outwardly from the throat, located in said substantially vertical wall of the inner surface of the tubular body between the throat and the pouring lip a recess adapted to hold several drops of liquid and no more when the adapter is in the pouring position, the edge of the recess which is farthest from the pouring lip being lower than the edge nearest the lip so that substantially all of the liquid in the recess will drain toward the throat when the vessel is in the upright position, and a groove in said surface extending from the recess to the pouring lip, the exterior surface of the tubular body being undercut from the pouring lip in the normally upright position of the adapter the pouring lip being located above the throat when the vessel is in the normally upright position.

3. A pouring outlet for a vessel in which there is a high point where a stream of liquid poured from the vessel is broken into two parts when pouring ceases, the lip of the vessel being above said high point when the vessel is in its normally upright position, the outer wall of the vessel being undercut at the lip, said pouring outlet including a wall portion between said high point and the lip, which is substantially vertical when the vessel is in the upright position and in which is a recess which holds several drops of liquid but no more when the vessel is in the pouring position, the edge of which recess farthest from the lip is lower than the edge nearest the lip so that substantially all of the liquid in the recess drains into the vessel when the vessel is in an upright position, and a groove leading from the recess to the lip and draining into the recess when the vessel is in its normally upright position, whereby when pouring ceases the liquid in the recess pulls to itself liquid remaining on the inner surface of the pouring outlet above the high point which liquid drains back into the vessel when the vessel is returned to its normally upright position.

JAY GOULD LIVINGSTONE.

REFERENCES CITED

The following references are of record in the file of this patent:

UNITED STATES PATENTS

| Number | Name | Date |
|---|---|---|
| 1,282,103 | Moffat | Oct. 22, 1918 |
| 1,357,629 | Faistl et al. | Nov. 2, 1920 |
| 1,416,309 | Tunnicliff | May 16, 1922 |
| 2,442,047 | Kemper | May 25, 1948 |

FOREIGN PATENTS

| Number | Country | Date |
|---|---|---|
| 174,886 | Great Britain | Feb. 9, 1922 |
| 366,207 | Great Britain | Feb. 4, 1932 |
| 457,585 | Germany | Mar. 25, 1926 |